US012640305B2

(12) United States Patent

Suzuki et al.

(10) Patent No.: US 12,640,305 B2

(45) Date of Patent: May 26, 2026

(54) COIL COMPONENT AND MANUFACTURING METHOD THEREFOR

(71) Applicant: TDK Corporation, Tokyo (JP)

(72) Inventors: Masanori Suzuki, Tokyo (JP); Nobuya Takahashi, Tokyo (JP); Akira Motohashi, Tokyo (JP); Naoaki Fujii, Tokyo (JP); Masaki Yoneyama, Tokyo (JP); Tomonaga Nishikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 704 days.

(21) Appl. No.: 18/245,413

(22) PCT Filed: Sep. 7, 2021

(86) PCT No.: PCT/JP2021/032851

§ 371 (c)(1),
(2) Date: Mar. 15, 2023

(87) PCT Pub. No.: WO2022/070805

PCT Pub. Date: Apr. 7, 2022

(65) Prior Publication Data

US 2023/0352233 A1 Nov. 2, 2023

(30) Foreign Application Priority Data

Sep. 30, 2020 (JP) ................................ 2020-164266

(51) Int. Cl.
*H01F 27/32* (2006.01)
*H01F 17/00* (2006.01)
(Continued)

(52) U.S. Cl.
CPC ....... *H01F 27/323* (2013.01); *H01F 17/0013* (2013.01); *H01F 41/041* (2013.01); *H01F 41/122* (2013.01); *H01F 2017/0073* (2013.01)

(58) Field of Classification Search
CPC .. H01F 27/323; H01F 17/0013; H01F 41/041; H01F 41/122; H01F 2017/0073
See application file for complete search history.

(56) References Cited

U.S. PATENT DOCUMENTS

2016/0155557 A1* 6/2016 Park .................... H01F 17/0013 336/83
2017/0125153 A1* 5/2017 Yoshioka ................ H01F 5/003
(Continued)

FOREIGN PATENT DOCUMENTS

JP 2017-199800 A 11/2017
JP 2019-140202 A 8/2019

OTHER PUBLICATIONS

International Search Report issued in corresponding International Patent Application No. PCT/JP2021/032851, dated Dec. 14, 2021, with English translation.

*Primary Examiner* — Malcolm Barnes
(74) *Attorney, Agent, or Firm* — Rimon P.C.

(57) ABSTRACT

A coil component includes a coil part having a structure in which interlayer insulating films 51 to 55 and coil patterns CP1 to CP4 are alternately stacked in the coil axis direction and magnetic element bodies M1 to M4 embedding therein the coil part. A radial width of a part of the interlayer insulating film that is positioned between the magnetic element body M1 positioned in the inner diameter area of the coil part and the innermost turn of the coil pattern CP4 is larger than radial widths L11, L21, and L31 of parts of the interlayer insulating films 52 to 54 that are positioned between the magnetic element body M1 and the innermost turns of the coil patterns CP1 to CP3.

9 Claims, 14 Drawing Sheets

1

(51) Int. Cl.
*H01F 41/04* (2006.01)
*H01F 41/12* (2006.01)

(56) References Cited

U.S. PATENT DOCUMENTS

| | | | | |
|---|---|---|---|---|
| 2017/0316867 | A1* | 11/2017 | Kamijima | H01F 17/0013 |
| 2019/0244750 | A1* | 8/2019 | Suzuki | H01F 41/041 |

* cited by examiner

COIL COMPONENT AND MANUFACTURING METHOD THEREFOR

CROSS REFERENCE TO RELATED APPLICATIONS

This application is the U.S. National Phase under 35 U.S.C. § 371 of International Application No. PCT/JP2021/032851, filed on Sep. 7, 2021, which claims the benefit of Japanese Application No. 2020-164266, filed on Sep. 30, 2020, the entire contents of each are hereby incorporated by reference.

TECHNICAL FIELD

The present invention relates to a coil component and a manufacturing method therefor and, more particularly, to a coil component having a structure in which spiral coil patterns are stacked one on another and a manufacturing method for such a coil component.

BACKGROUND ART

As a coil component having a structure in which spiral coil patterns are stacked, a coil component described in Patent Document 1 is known. The coil component described in Patent Document 1 has a coil part including a plurality of coil patterns and a magnetic element body embedding therein the coil part. Such a structure in which the coil part is embedded in the magnetic element body allows a high inductance value to be obtained.

CITATION LIST

[Patent Document]
[Patent Document 1] JP 2019-140202A

SUMMARY OF THE INVENTION

Problem to be Solved by the Invention

However, in a process of embedding the coil part in the magnetic element body, a high pressure is applied to a coil pattern positioned at an end portion in the coil axial direction, so that the coil pattern at the axial end portion may be deformed in some cases.

It is therefore an object of the present invention to prevent deformation of a coil pattern in a coil component having a structure in which spiral coil patterns are stacked one on another and a manufacturing method for such a coil component.

Means for Solving the Problem

A coil component according to the present invention includes: a coil part having a structure in which a plurality of interlayer insulating films and a plurality of spirally wound coil patterns are alternately stacked in the coil axis direction; and a magnetic element body embedding therein the coil part. The plurality of coil patterns includes at least a first coil pattern positioned at one end in the coil axis direction and a second coil pattern different from the first coil pattern. The plurality of interlayer insulating films includes a first interlayer insulating film covering the first coil pattern at least in the radial direction and a second interlayer insulating film covering the second coil pattern at least in the radial direction. The magnetic element body has a first part positioned in the inner diameter area of the coil part. The radial width of a part of the first interlayer insulating film that is positioned between the first part of the magnetic element body and the innermost turn of the first coil pattern is larger than the radial width of a part of the second interlayer insulating film that is positioned between the first part of the magnetic element body and the innermost turn of the second coil pattern.

According to the present invention, the width of the first interlayer insulating film is enlarged at the innermost peripheral side, so that pressure to be applied to the innermost turn of the first coil pattern when the magnetic element body is filled in the inner diameter area of the coil part is reduced. This makes it possible to prevent deformation of the first coil pattern.

In the present invention, the first interlayer insulating film may further cover the first coil pattern from the one end side in the coil axis direction. Thus, even when the base of the first coil pattern has low flatness, the first coil pattern can be formed properly.

In the present invention, the second coil pattern may be adjacent to the first coil pattern in the coil axis direction or positioned at the other end in the coil axis direction. In either case, a sufficient pattern width can be ensured for the second coil pattern.

In the present invention, the magnetic element body may further have a second part positioned at the radially outside area of the coil part, and the radial width of a part of the first interlayer insulating film that is positioned between the second part of the magnetic element body and the outermost turn of the first coil pattern may be larger than the radial width of a part of the second insulating layer that is positioned between the second part of the magnetic element body and the outermost turn of the second coil pattern. This allows a reduction in pressure to be applied to the outermost turn of the first coil pattern when the magnetic element body is filled in the outer diameter area of the coil part.

In the present invention, the radial width of a part of the first interlayer insulating film that is positioned between two radially adjacent turns of the plurality of turns constituting the first coil pattern may be the same as the radial width of a part of the second interlayer insulating film that is positioned between two radially adjacent turns of the plurality of turns constituting the second coil pattern. This can ensure a sufficient pattern width for the first and second coil patterns.

A coil component manufacturing method according to the present invention includes a first step of forming a coil part by alternately stacking a plurality of interlayer insulating films and a plurality of spirally wound coil patterns and a second step of embedding the coil part in a magnetic element body. The plurality of coil patterns includes a first coil pattern formed last and a second coil pattern different from the first coil pattern. The plurality of interlayer insulating films includes a first interlayer insulating film covering the first coil pattern at least in the radial direction and a second interlayer insulating film covering the second coil pattern at least in the radial direction. The magnetic element body has a first part positioned in the inner diameter area of the coil part. The radial width of a part of the first interlayer insulating film that is positioned between the first part of the magnetic element body and the innermost turn of the first coil pattern is larger than the radial width of a part of the second interlayer insulating film that is positioned between the first part of the magnetic element body and the innermost turn of the second coil pattern.

According to the present invention, even when the base of the first coil pattern has a low degree of flatness, it is possible to properly form the first coil pattern and to prevent deformation of the first coil pattern in the step of filling the magnetic element body in the inner diameter area of the coil part.

Advantageous Effects of the Invention

As described above, according to the present invention, it is possible to prevent deformation of a coil pattern in a coil component having a structure in which a plurality of spiral coil patterns are stacked and a manufacturing method for such a coil component.

MODE FOR CARRYING OUT THE INVENTION

Hereinafter, preferred embodiments of the present invention will be described in detail with reference to the accompanying drawings.

Figure 1:
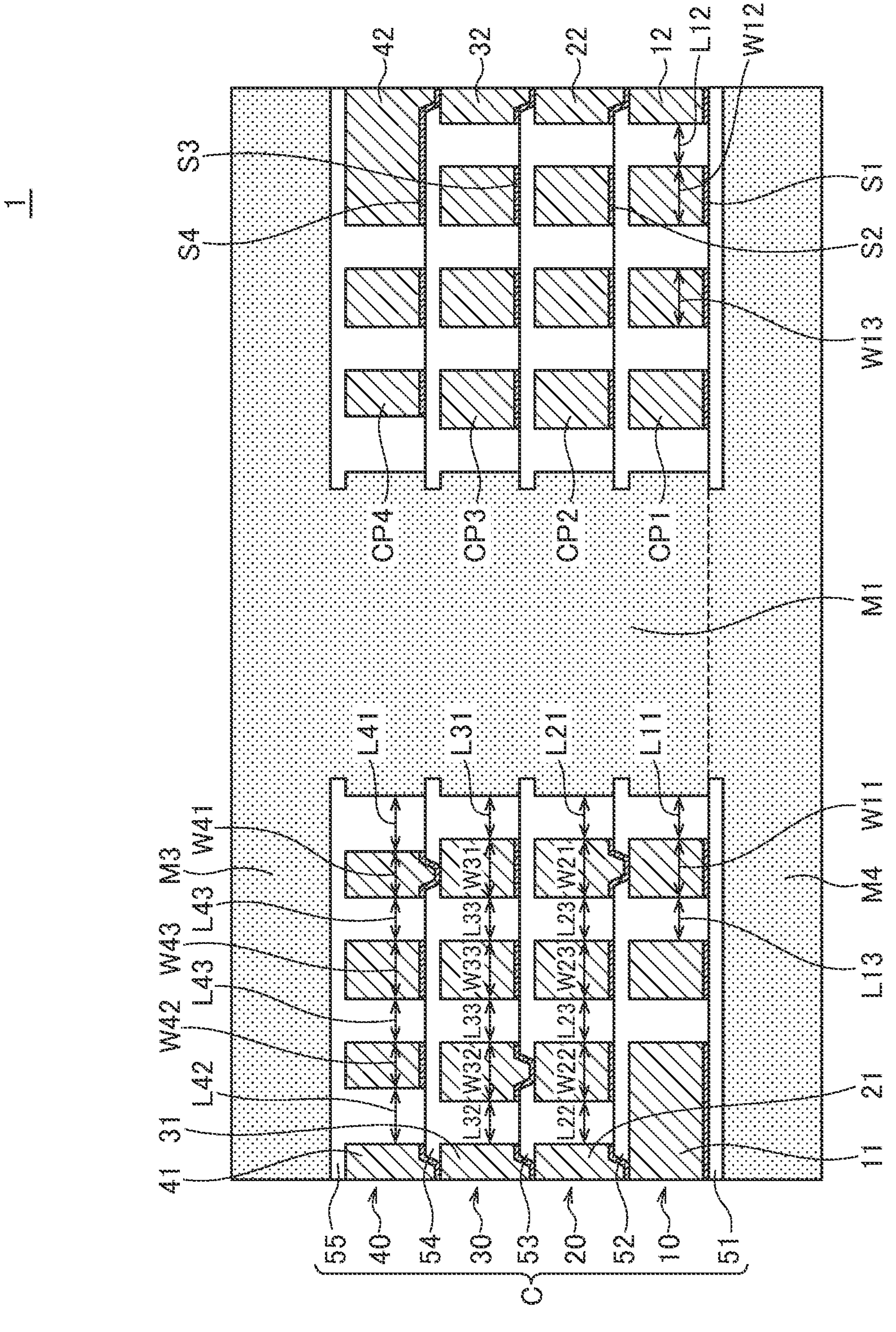
FIG. 1 is a schematic cross-sectional view for explaining the structure of a coil component 1 according to an embodiment of the present invention.

FIG. 1 is a schematic cross-sectional view for explaining the structure of a coil component 1 according to an embodiment of the present invention.

The coil component 1 according to the embodiment of the present invention is a surface-mount type chip component suitably used as an inductor for a power supply circuit and has, as illustrated in FIG. 1, magnetic element bodies M1 to M4 (magnetic element bodies M2 appears in FIGS. 2 to 5) and a coil part C embedded in the magnetic element bodies M1 to M4. Although the configuration of the coil part C will be described later, in the present embodiment, four conductor layers each having a spiral coil pattern are stacked through interlayer insulating films to form one coil conductor.

The magnetic element bodies M1 to M4 are each a composite member containing magnetic metal filler made of iron (Fe) or a permalloy-based material and a resin binder and form a magnetic path for magnetic flux generated by a current flowing in the coil part C. The resin binder is preferably epoxy resin of liquid or powder. The magnetic element bodies M1 to M4 may be made of the same material or mutually different materials. The magnetic element body M1 is a part filled in the inner diameter area of the coil part C, the magnetic element body M2 is a part positioned at the radially outside area of the coil part C, the magnetic element body M3 is a part covering the coil part C from one side (lower side in FIG. 1) in the axial direction of the coil part C, and the magnetic element body M4 is a part covering the coil part C from the other side (upper side in FIG. 1) in the axial direction.

As illustrated in FIG. 1, the coil part C has alternately stacked interlayer insulating films 51 to 55 and conductor layers 10, 20, 30, and 40. The planar shapes of the conductor layers 10, 20, 30, and 40 are illustrated in FIGS. 2 to 5, respectively. The conductor layers 10, 20, 30, and 40 have spiral coil patterns CP1 to CP4, respectively, and the upper or lower surfaces of the coil patterns CP1 to CP4 are covered with the interlayer insulating films 51 to 55. The side surfaces of the coil patterns CP1 to CP4 are covered respectively with the interlayer insulating films 52 to 55. The above-mentioned upper and lower surfaces of the coil patterns CP1 to CP4 each refer to a surface substantially perpendicular to the coil axis, and the side surfaces of the coil patterns CP1 to CP4 each refer to surfaces parallel to the coil axis.

The coil patterns CP1 to CP4 are mutually connected through through holes formed in the interlayer insulating films 52 to 54 to constitute one coil conductor. The conductor layers 10, 20, 30, and 40 are preferably made of copper (Cu). The interlayer insulating films 51 to 55 are made of a resin material. Of the interlayer insulating films 51 to 55, at least the interlayer insulating films 52 to 54 are made of a non-magnetic material. The interlayer insulating film 51 in the lowermost layer and the interlayer insulating film 55 in the uppermost layer may have magnetism.

Figure 2:
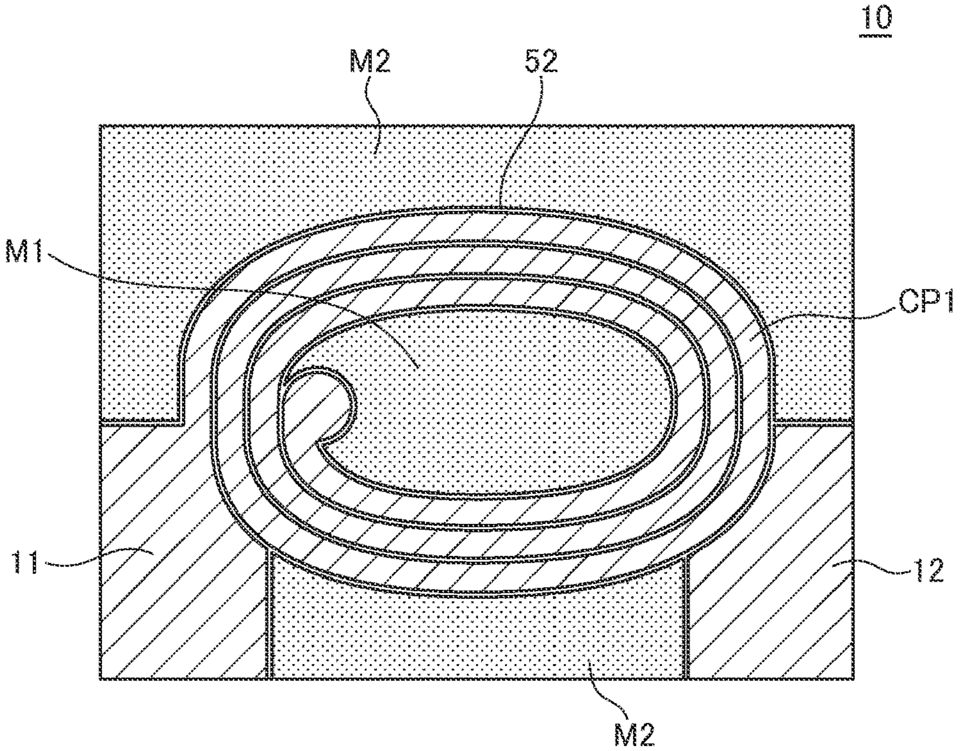
FIG. 2 is a schematic plan view of a conductor layer 10.

The conductor layer 10 is the first conductor layer formed on the upper surface of the magnetic element body M2 through the interlayer insulating film 51 and includes an underlying seed layer S1. As illustrated in FIG. 2, the conductor layer 10 has the coil pattern CP1 spirally wound in about three turns and two electrode patterns 11 and 12. The lower surface of the coil pattern CP1 is covered with the interlayer insulating film 51, and the side and upper surfaces thereof are covered with the interlayer insulating film 52. The coil pattern CP1 and electrode pattern 11 are connected to each other, whereas the electrode pattern 12 is provided independently of the coil pattern CP1. The electrode patterns 11 and 12 are exposed from the magnetic element bodies M1 to M4.

Figure 3:
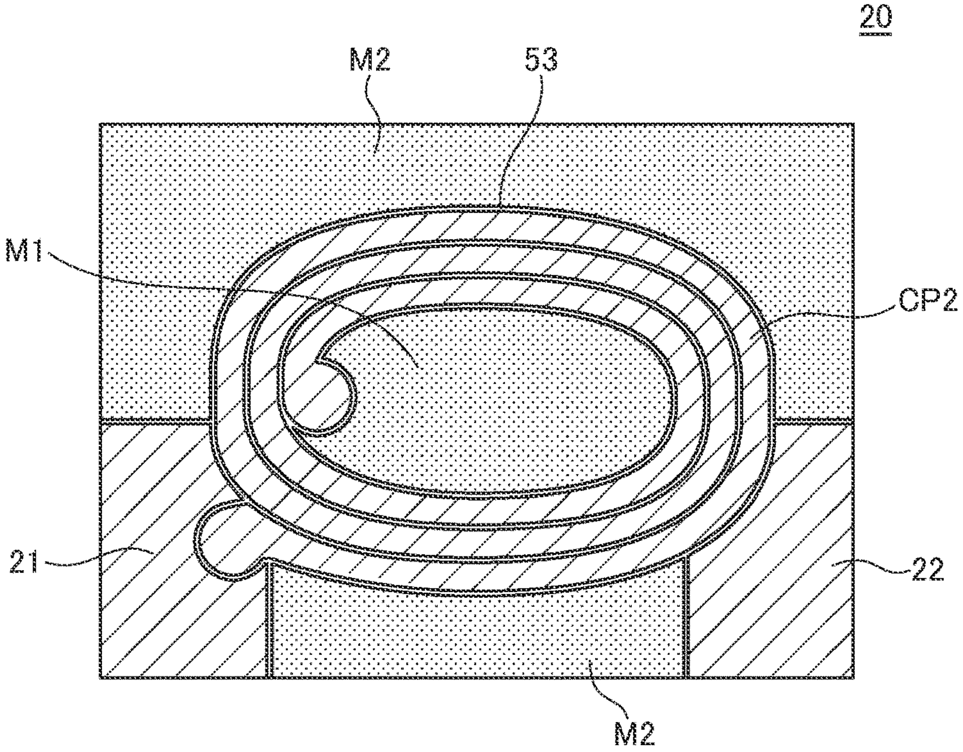
FIG. 3 is a schematic plan view of a conductor layer 20.

The conductor layer 20 is the second conductor layer formed on the upper surface of the conductor layer 10 through the interlayer insulating film 52 and includes an underlying seed layer S2. As illustrated in FIG. 3, the conductor layer 20 has the coil pattern CP2 spirally wound in about three turns and two electrode patterns 21 and 22. The lower surface of the coil pattern CP2 is covered with the interlayer insulating film 52, and the side and upper surfaces thereof are covered with the interlayer insulating film 53. Both the electrode patterns 21 and 22 are provided independently of the coil pattern CP2. The electrode patterns 21 and 22 are exposed from the magnetic element bodies M1 to M4.

Figure 4:
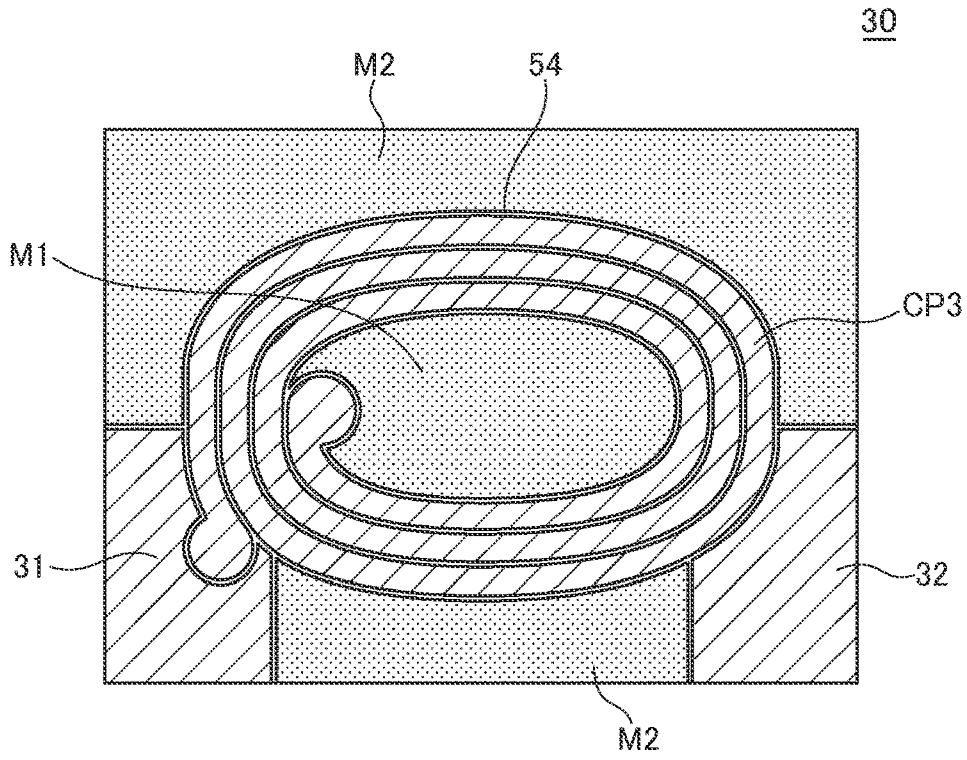
FIG. 4 is a schematic plan view of a conductor layer 30.

The conductor layer 30 is the third conductor layer formed on the upper surface of the conductor layer 20 through the interlayer insulating film 53 and includes an underlying seed layer S3. As illustrated in FIG. 4, the conductor layer 30 has the coil pattern CP3 spirally wound in about three turns and two electrode patterns 31 and 32. The lower surface of the coil pattern CP3 is covered with the interlayer insulating film 53, and the side and upper surfaces thereof are covered with the interlayer insulating film 54. Both the electrode patterns 31 and 32 are provided independently of the coil pattern CP3. The electrode patterns 31 and 32 are exposed from the magnetic element bodies M1 to M4.

Figure 5:
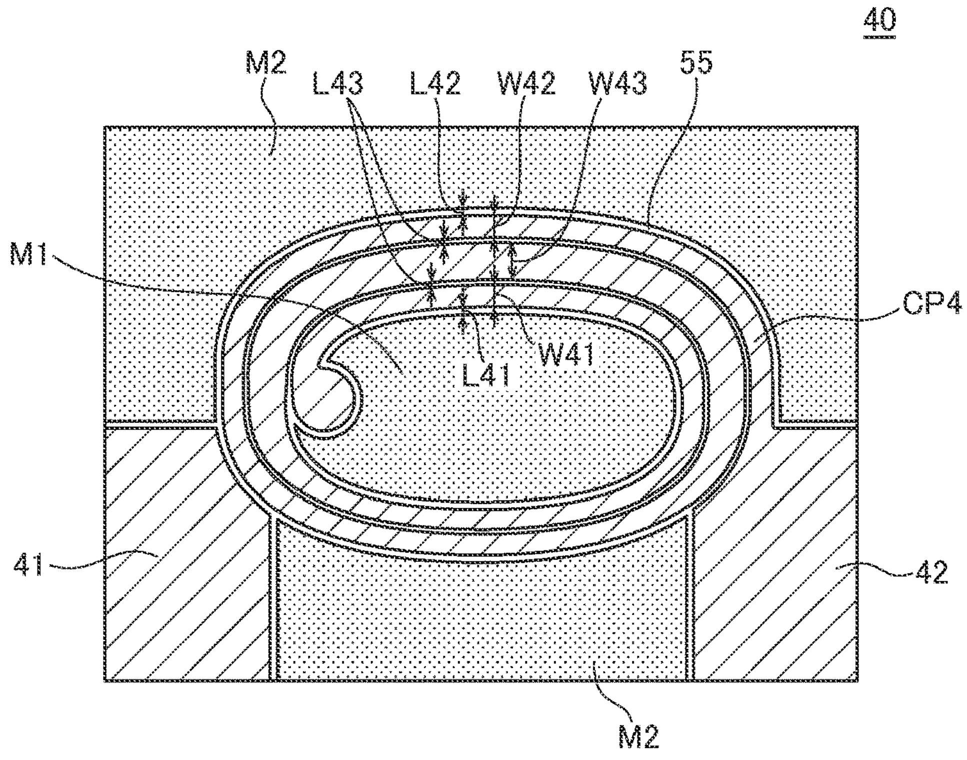
FIG. 5 is a schematic plan view of a conductor layer 40.

The conductor layer 40 is the fourth conductor layer formed on the upper surface of the conductor layer 30 through the interlayer insulating film 54 and includes an underlying seed layer S4. As illustrated in FIG. 5, the conductor layer 40 has the coil pattern CP4 spirally wound in about 2.5 turns and two electrode patterns 41 and 42. The lower surface of the coil pattern CP4 is covered with the interlayer insulating film 54, and the side and upper surfaces thereof are covered with the interlayer insulating film 55. The coil pattern CP4 and electrode pattern 42 are connected to each other, whereas the electrode pattern 41 is provided independently of the coil pattern CP4. The electrode patterns 41 and 42 are exposed from the magnetic element bodies M1 to M4.

The inner peripheral end of the coil pattern CP1 and the inner peripheral end of the coil pattern CP2 are connected through a via conductor constituting a part of the conductor layer 20 and penetrating the interlayer insulating film 52. The outer peripheral end of the coil pattern CP2 and the outer peripheral end of the coil pattern CP3 are connected through a via conductor constituting a part of the conductor layer 30 and penetrating the interlayer insulating film 53. The inner peripheral end of the coil pattern CP3 and the inner peripheral end of the coil pattern CP4 are connected through a via conductor constituting a part of the conductor layer 40 and penetrating the interlayer insulating film 54. As a result, the coil patterns CP1 to CP4 are connected in series to form a coil conductor having a plurality of turns. The electrode patterns 11, 21, 31, and 41 are used as one external terminal, and the electrode patterns 12, 22, 32, and 42 are used as the other external terminal.

As illustrated in FIG. 1, the radial width of the innermost turn of the coil pattern CP1 is W11, the radial width of the outermost turn of the coil pattern CP1 is W12, and the radial width of a turn of the coil pattern CP1 that is positioned between the innermost and outermost turns thereof is W13. The radial width of the innermost turn of the coil pattern CP2 is W21, the radial width of the outermost turn of the coil pattern CP2 is W22, and the radial width of a turn of the coil pattern CP2 that is positioned between the innermost and outermost turns thereof is W23. The radial width of the innermost turn of the coil pattern CP3 is W31, the radial width of the outermost turn of the coil pattern CP3 is W32, and the radial width of a turn of the coil pattern CP3 that is positioned between the innermost and outermost turns thereof is W33. The radial width of the innermost turn of the coil pattern CP4 is W41, the radial width of the outermost turn of the coil pattern CP4 is W42, and the radial width of a turn of the coil pattern CP4 that is positioned between the innermost and outermost turns thereof is W43.

The radial width of the interlayer insulating film 52 positioned between the innermost turn of the coil pattern CP1 and the magnetic element body M1 is L11, the radial width of the interlayer insulating film 52 positioned between the outermost turn of the coil pattern CP1 and the magnetic element body M2 is L12, and the radial of the interlayer insulating film 52 positioned between the two radially adjacent turns of the coil pattern CP1 is L13. The radial width of the interlayer insulating film 53 positioned between the innermost turn of the coil pattern CP2 and the magnetic element body M1 is L21, the radial width of the interlayer insulating film 53 positioned between the outermost turn of the coil pattern CP2 and the magnetic element body M2 is L22, and the radial of the interlayer insulating film 53 positioned between the two radially adjacent turns of the coil pattern CP2 is L23. The radial width of the interlayer insulating film 54 positioned between the innermost turn of the coil pattern CP3 and the magnetic element body M1 is L31, the radial width of the interlayer insulating film 54 positioned between the outermost turn of the coil pattern CP3 and the magnetic element body M2 is L32, and the radial of the interlayer insulating film 54 positioned between the two radially adjacent turns of the coil pattern CP3 is L33. The radial width of the interlayer insulating film 55 positioned between the innermost turn of the coil pattern CP4 and the magnetic element body M1 is L41, the radial width of the interlayer insulating film 55 positioned between the outermost turn of the coil pattern CP4 and the magnetic element body M2 is L42, and the radial width of the interlayer insulating film 55 positioned between the two radially adjacent turns of the coil pattern CP4 is L43.

In the present embodiment, L11, L21, L31<L41 and L12, L22, L32<L42 are satisfied, and W11, W21, W31<W41 and W12, W22, W32<W42 are satisfied. That is, the widths W41 and 42 of the innermost and outermost turns of the coil pattern CP4 are reduced and, correspondingly, the widths L41 and L42 of parts of the interlayer insulating film 55 that are positioned respectively between the innermost turns of the coil pattern CP4 and magnetic element body M1 and between the outermost turns of the coil pattern CP4 and magnetic element body M2 are enlarged. This is for preventing deformation of the coil pattern CP4 in a manufacturing process to be described later. The widths W41 and W42 may be the same.

The widths W41 and W42 need not necessarily be reduced over the entire periphery and may partly be the same as or slightly larger than the widths W11, W21, W31, W12, W22, and W33. Similarly, the widths L41 and L42 need not necessarily be enlarged over the entire periphery and may partly be the same as or slightly smaller than the widths L11, L21, L31, L12, L22, and L33.

The width W43 of the coil pattern CP4 may be the same as the widths W13, W23, and W33 of the other coil patterns CP1 to CP3. The widths W13, W23, W33, and W43 may be the same as the widths W11, W21, W31, W12, W22, and W32 of the innermost and outermost turns of the respective coil patterns CP1 to CP3.

Similarly, the width L43 of the interlayer insulating film 55 may be the same as the widths L13, L23, and L33 of the other interlayer insulating films 52 to 54. The widths L13, L23, L33, and L43 may be the same as the widths L11, L21, L31, L12, L22, and L32 covering the innermost and outermost turns of the respective coil patterns CP1 to CP3.

The following describes a manufacturing method for the coil component 1 according to the present embodiment.

FIGS. 6 to 31 are process views for explaining the manufacturing method for the coil component 1 according to the present embodiment. Although the process views illustrated in FIGS. FIGS. 6 to 31 each illustrate a cross section corresponding to one coil component 1, multiple coil components 1 can actually be produced at a time using an aggregate substrate.

Figure 6:
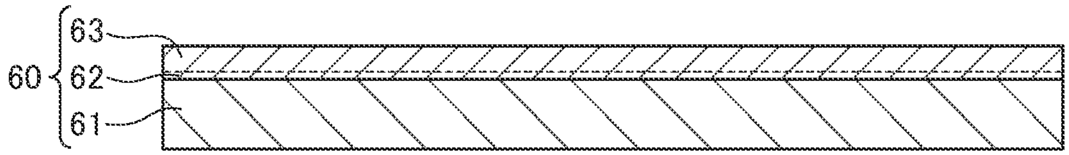
FIG. 6 is a process view for explaining the manufacturing method for the coil component 1.
Figure 7:
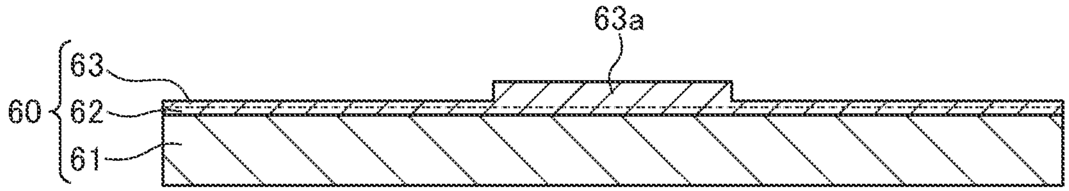
FIG. 7 is a process view for explaining the manufacturing method for the coil component 1.

A support 60 having a structure in which metal foils 62 and 63 such as copper (Cu) foils are provided on the surface of a base 61 is prepared (FIG. 6). A peeling layer is provided at the interface between the metal foils 62 and 63. Then, the metal foil 63 is patterned to form a protruding part 63*a* protruding from the metal foil 63 (FIG. 7).

Figure 8:
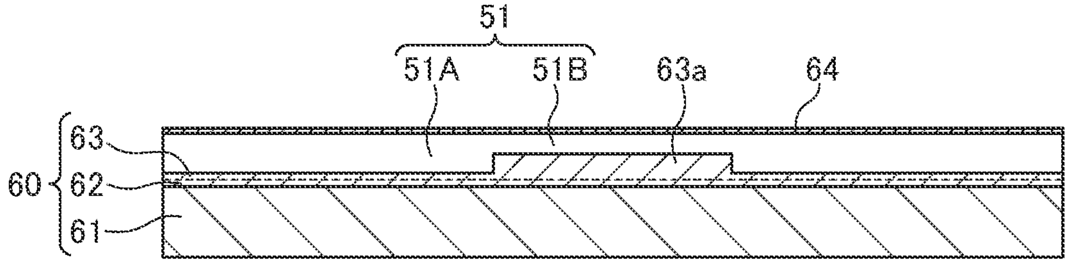
FIG. 8 is a process view for explaining the manufacturing method for the coil component 1.
Figure 9:
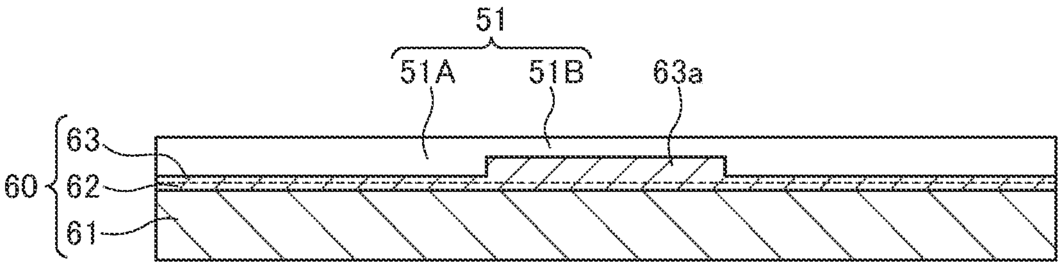
FIG. 9 is a process view for explaining the manufacturing method for the coil component 1.

Then, the interlayer insulating film 51 and a metal foil 64 are formed on the surface of the metal foil 63 having the protruding part 63*a* (FIG. 8). The interlayer insulating film 51 and metal foil 64 can be formed by lamination process. As a result, the shape of the protruding part 63*a* is transferred to the interlayer insulating film 51, and thus the interlayer insulating film 51 has a large thickness area 51A and a small thickness area 51B.

Figure 10:
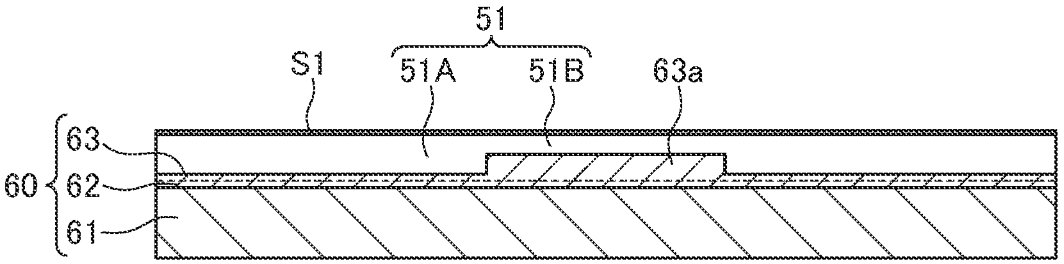
FIG. 10 is a process view for explaining the manufacturing method for the coil component 1.

After removal of the metal foil 64 by etching (FIG. 9), electroless plating is performed to form the seed layer S1 on the surface of the interlayer insulating film 51 (FIG. 10). The metal foil 64 may be used as a seed layer instead of forming the seed layer S1; however, the seed layer S1 is preferably as thin as possible, so that the seed layer S1 having a smaller thickness is preferably newly formed after removal of the metal foil 64.

Figure 11:
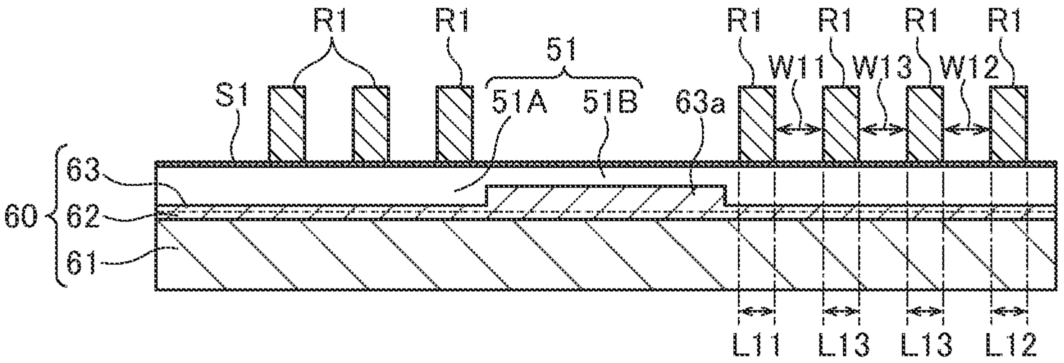
FIG. 11 is a process view for explaining the manufacturing method for the coil component 1.
Figure 12:
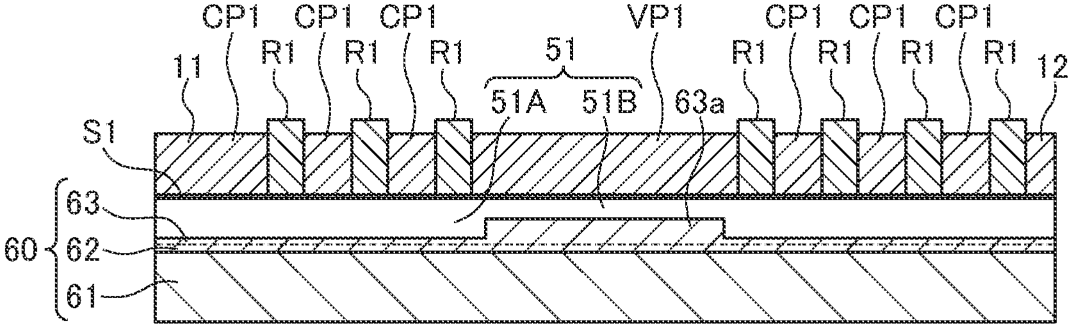
FIG. 12 is a process view for explaining the manufacturing method for the coil component 1.
Figure 13:
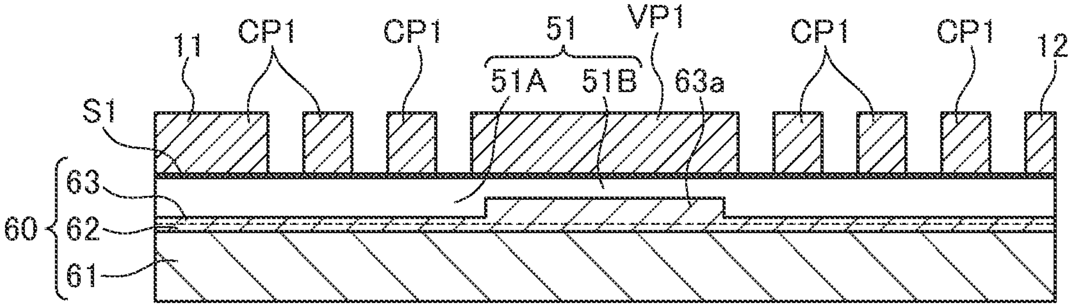
FIG. 13 is a process view for explaining the manufacturing method for the coil component 1.

Then, a resist pattern R1 is formed on the surface of the seed layer S1 (FIG. 11). The resist pattern R1 serves as a negative pattern of the conductor layer 10. The radial width and interval of the resist pattern R1 correspond respectively to the radial widths of the interlayer insulating film 52 and coil pattern CP1 to be formed thereafter. Specifically, the radial width of the resist pattern R1 corresponds to L11 to L13, and the radial interval of the resist pattern R1 corresponds to W11 to W13. The base of the resist pattern R1 has a high degree of flatness, thus allowing the radial widths L11 to L13 of the resist pattern R1 to be reduced sufficiently. In this state, electrolytic plating is performed to grow the seed layer S1 to thereby form the conductor layer 10 (FIG. 12). At this time, a sacrificial pattern VP1 is formed in the inner diameter area of the coil pattern CP1. The position of the resist pattern R1 is adjusted such that the sacrificial pattern VP1 completely overlaps the small thickness area 51A of the interlayer insulating film 51 and partly overlaps the large thickness area 51B.

Figure 14:
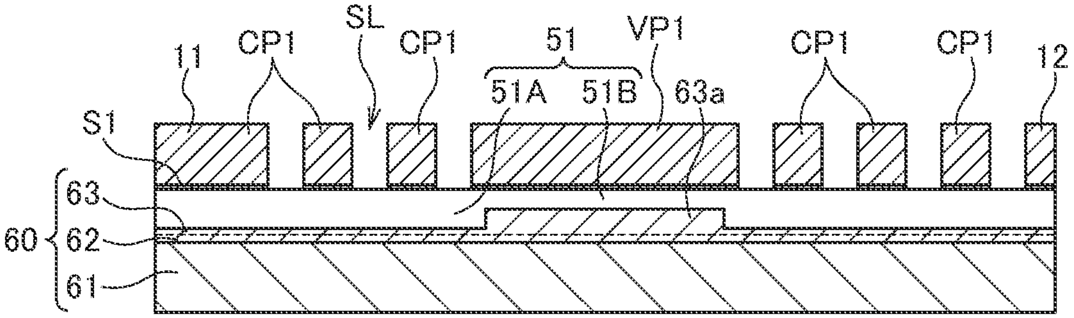
FIG. 14 is a process view for explaining the manufacturing method for the coil component 1.
Figure 15:
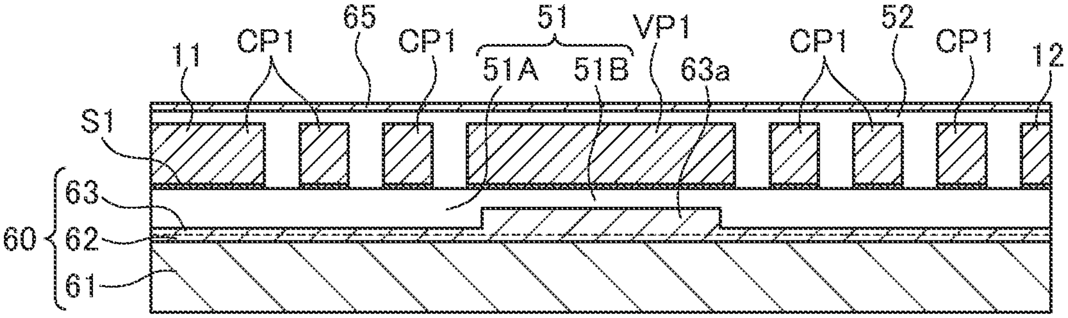
FIG. 15 is a process view for explaining the manufacturing method for the coil component 1.
Figure 16:
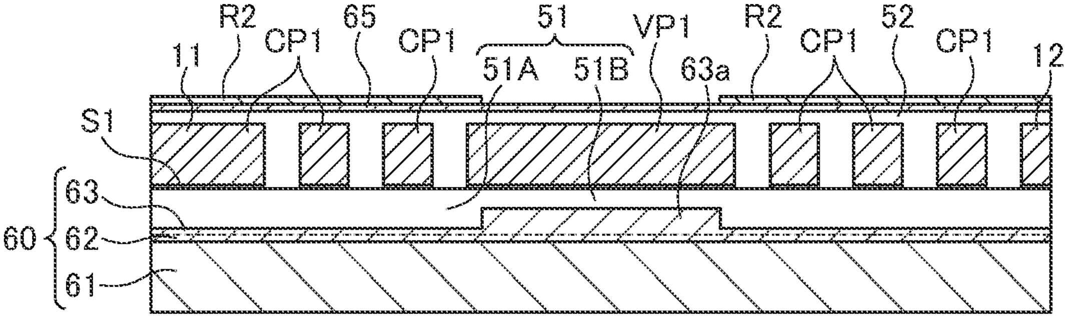
FIG. 16 is a process view for explaining the manufacturing method for the coil component 1.
Figure 17:
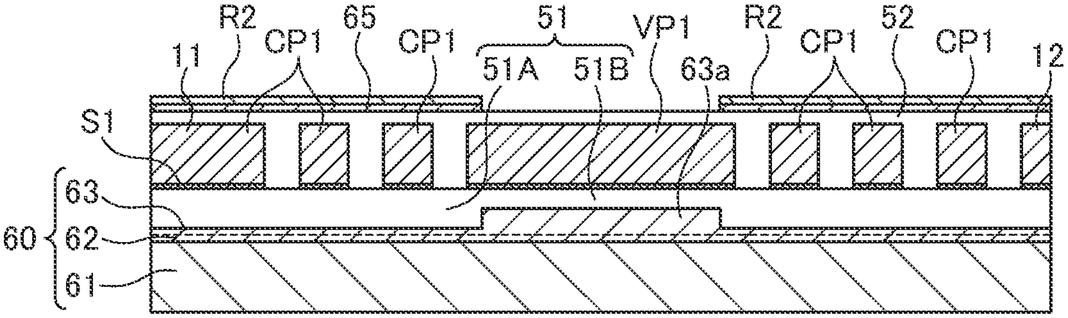
FIG. 17 is a process view for explaining the manufacturing method for the coil component 1.
Figure 18:
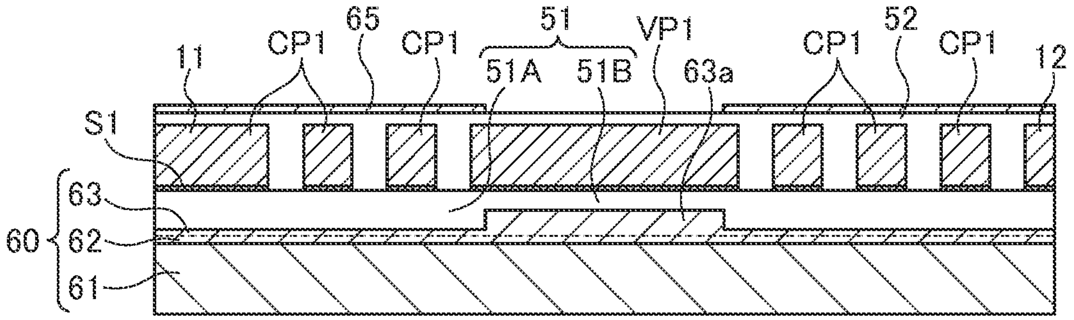
FIG. 18 is a process view for explaining the manufacturing method for the coil component 1.

After peeling of the resist pattern R1 (FIG. 13), a part of the seed layer S1 that is exposed to the peeling portion of the resist pattern R1 is removed by etching (FIG. 14). As a result, the coil pattern CP1 and sacrificial pattern VP1 are electrically isolated by a spiral slit SL. Subsequently, the interlayer insulating film 52 and a metal foil 65 are formed on the surface of the conductor layer 10 so as to fill the slit SL (FIG. 15). The interlayer insulating film 52 and metal foil 65 can be formed by lamination process. Then, a resist pattern R2 is formed on the surface of the metal foil 65 (FIG. 16), and the metal foil 65 is etched with the resist pattern R2 as a mask (FIG. 17). As a result, a part of the metal foil 65 that overlaps the sacrificial pattern VP1 is removed.

Figure 19:
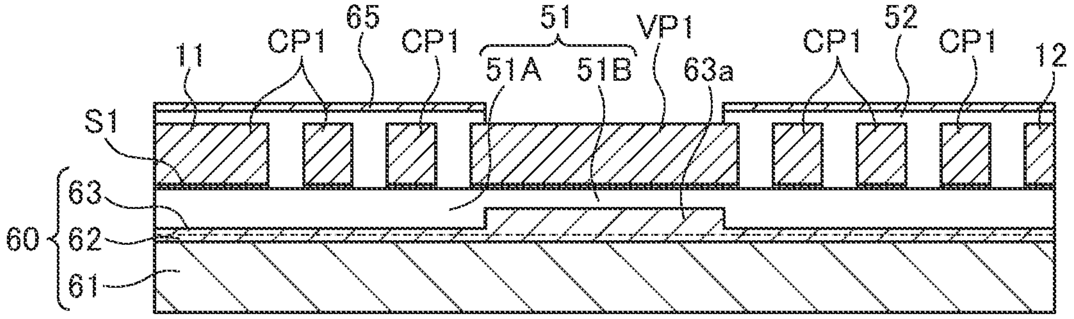
FIG. 19 is a process view for explaining the manufacturing method for the coil component 1.
Figure 20:
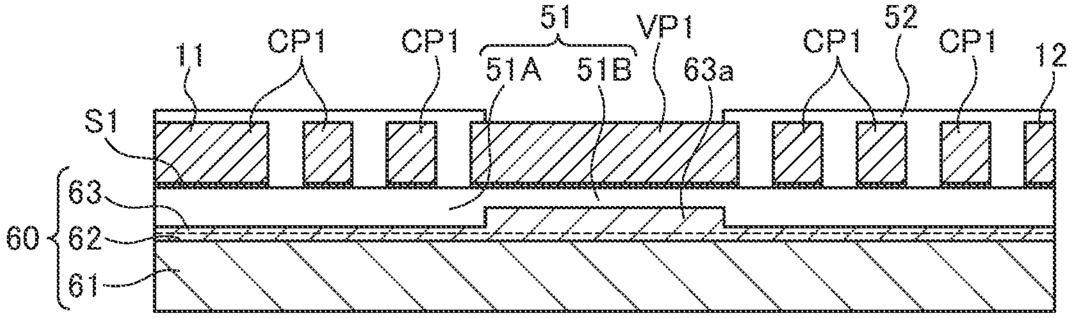
FIG. 20 is a process view for explaining the manufacturing method for the coil component 1.
Figure 21:
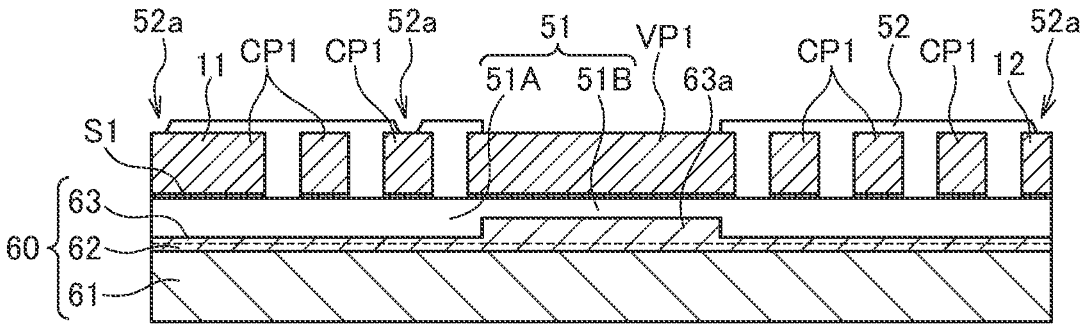
FIG. 21 is a process view for explaining the manufacturing method for the coil component 1.

After peeling of the resist pattern R2 (FIG. 18), blasting is performed with the metal foil 65 as a mask to expose the sacrificial pattern VP1 (FIG. 19). Then, after removal of the metal foil 65 (FIG. 20), laser machining is performed to form an opening 52*a* in the interlayer insulating film 52 (FIG. 21). Through the above processes, formation of the conductor layer 10 and interlayer insulating film 52 is completed.

Figure 22:
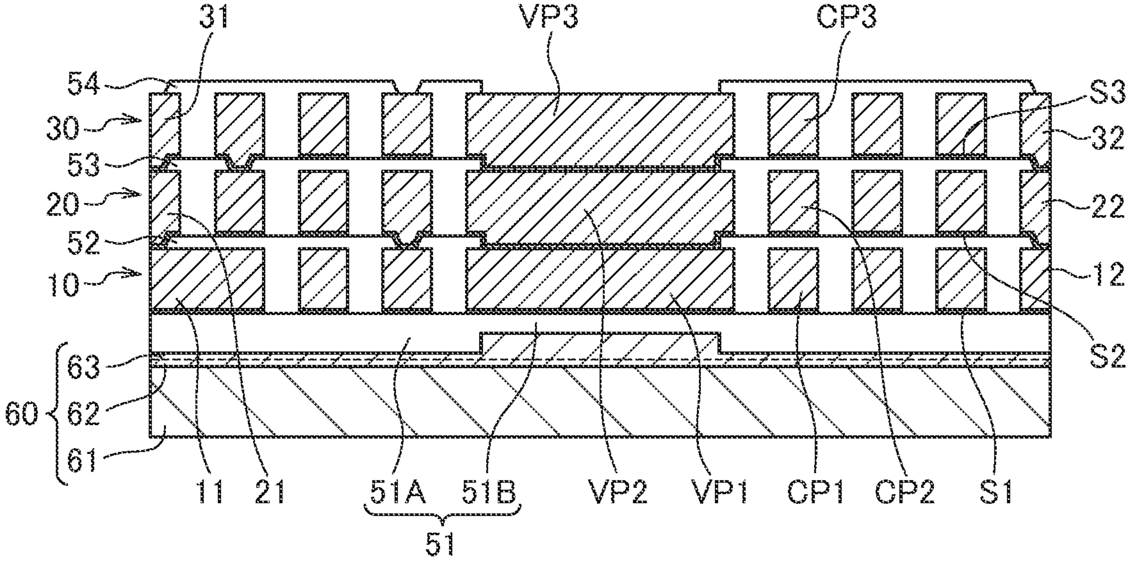
FIG. 22 is a process view for explaining the manufacturing method for the coil component 1.
Figure 23:
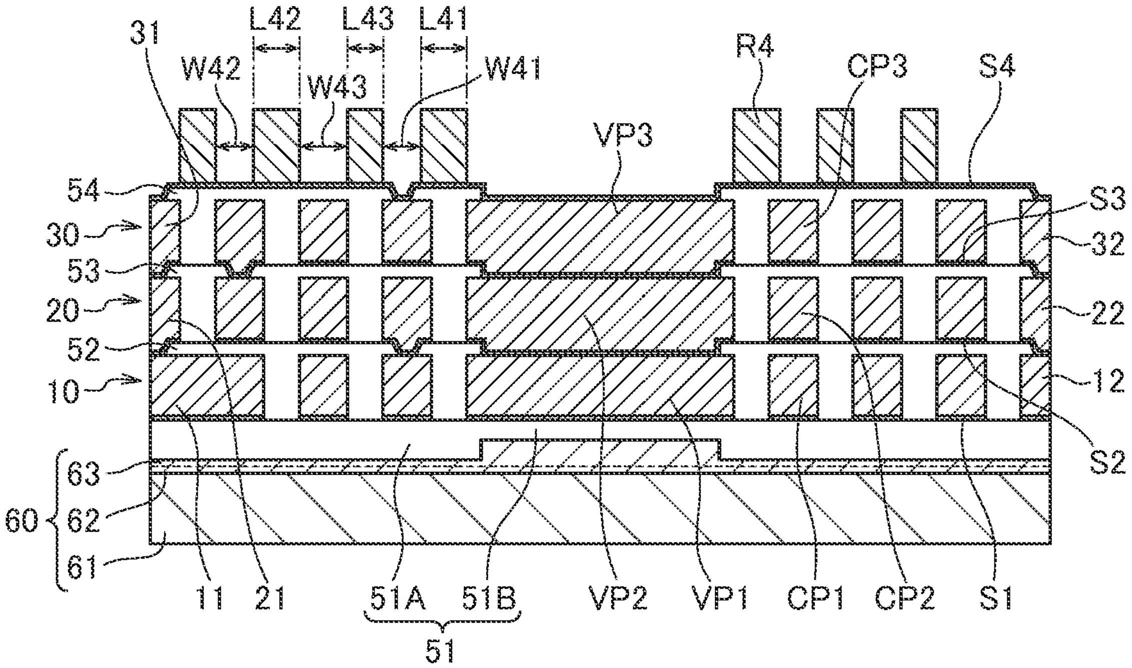
FIG. 23 is a process view for explaining the manufacturing method for the coil component 1.

Thereafter, by repeating the processes illustrated in FIGS. 10 to 21, the conductor layer 20, interlayer insulating film 53, conductor layer 30, and interlayer insulating film 54 are sequentially formed (FIG. 22). The conductor layers 20 and 30 include respectively sacrificial patterns VP2 and VP3 overlapping the sacrificial pattern VP1. Then, electroless plating is performed to form the seed layer S4 on the surface of the interlayer insulating film 54, followed by formation of a resist pattern R4 on the surface of the seed layer S4 (FIG. 23).

Figure 24:
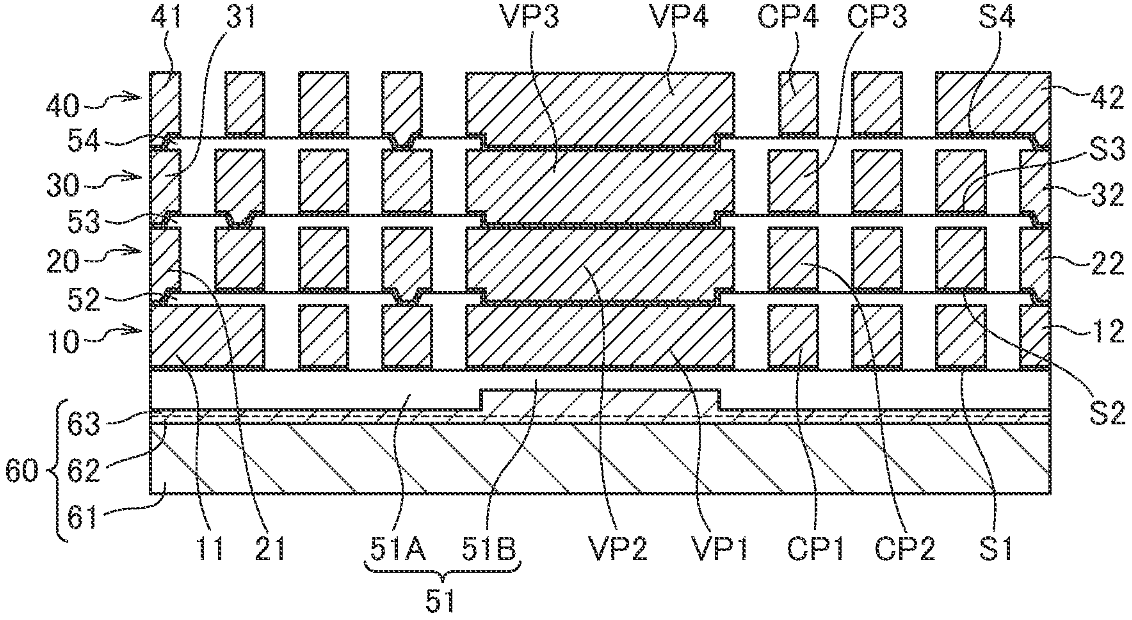
FIG. 24 is a process view for explaining the manufacturing method for the coil component 1.

The radial width and interval of the resist pattern R4 correspond respectively to the radial widths of the interlayer insulating film 55 and coil pattern CP4 to be formed thereafter. Specifically, the radial width of the resist pattern R4 corresponds to L41 to L43, and the radial interval of the resist patterns R4 corresponds to W41 to W43. Then, electrolytic plating is performed to grow the seed layer S4, the resist pattern R4 is peeled off, and a part of the seed layer S4 that is exposed to the peeling portion of the resist pattern R4 is removed by etching, whereby the conductor layer 40 is completed (FIG. 24).

Figure 25:
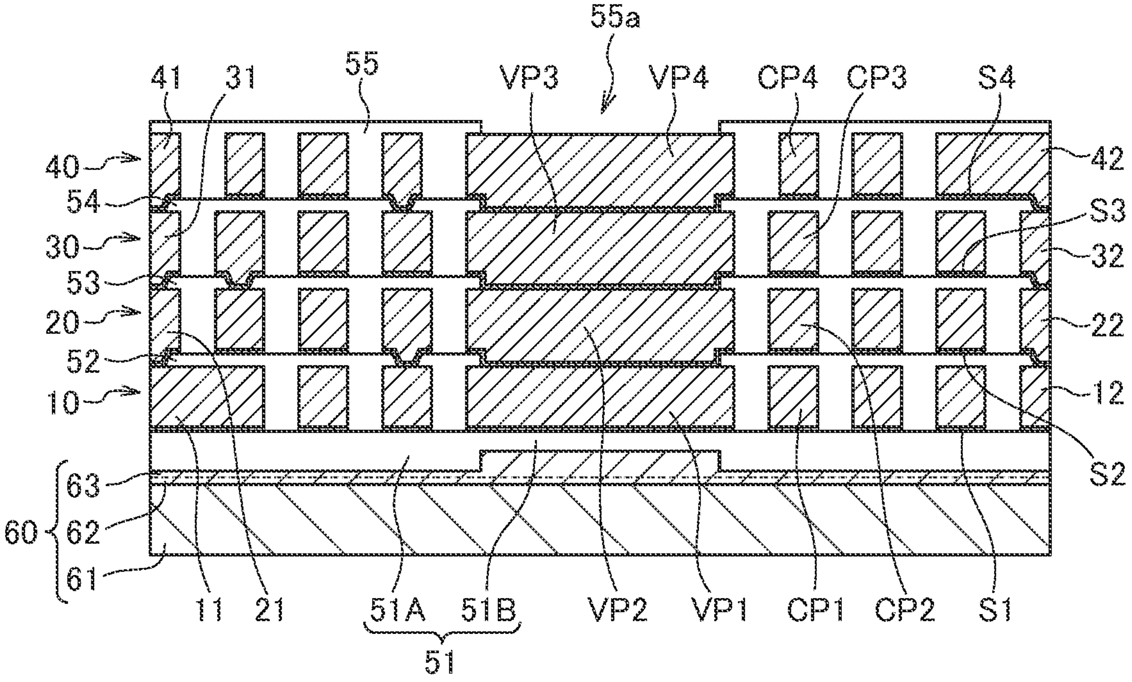
FIG. 25 is a process view for explaining the manufacturing method for the coil component 1.
Figure 26:
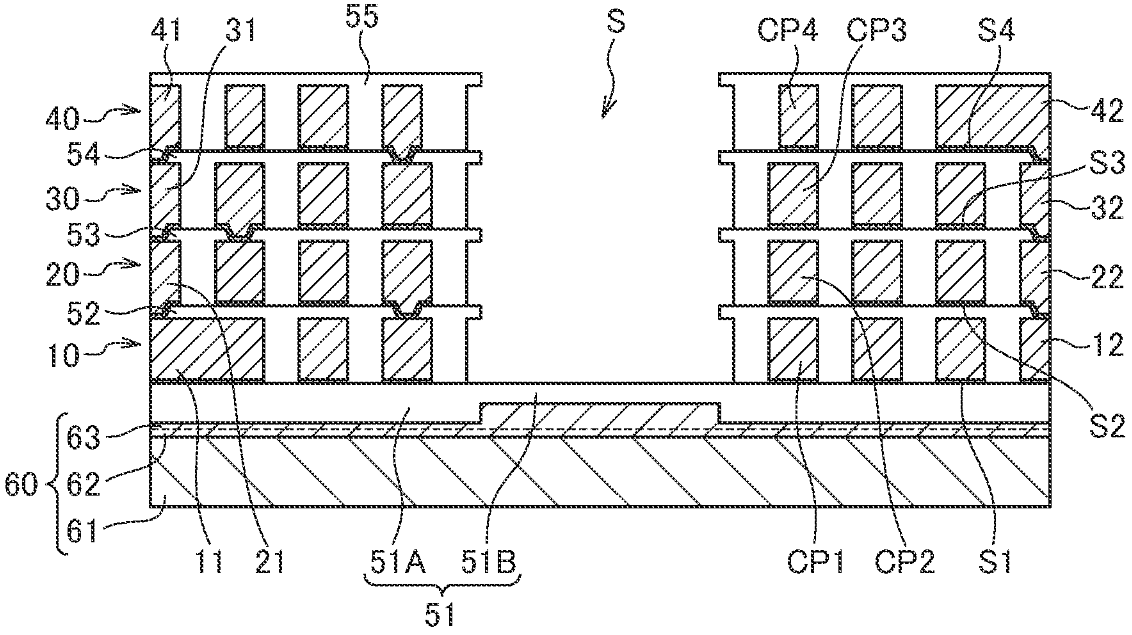
FIG. 26 is a process view for explaining the manufacturing method for the coil component 1.

Then, the interlayer insulating film 55 covering the conductor layer 40 is formed and then patterned to expose a sacrificial pattern VP4 (FIG. 25). In this state, wet-etching is performed to remove the sacrificial patterns VP1 to VP4 (FIG. 26). The coil patterns CP1 to CP4 are covered with the interlayer insulating films 51 to 55 and are thus not etched. As a result, a space S is formed in the inner diameter areas of the coil patterns CP1 to CP4.

Figure 27:
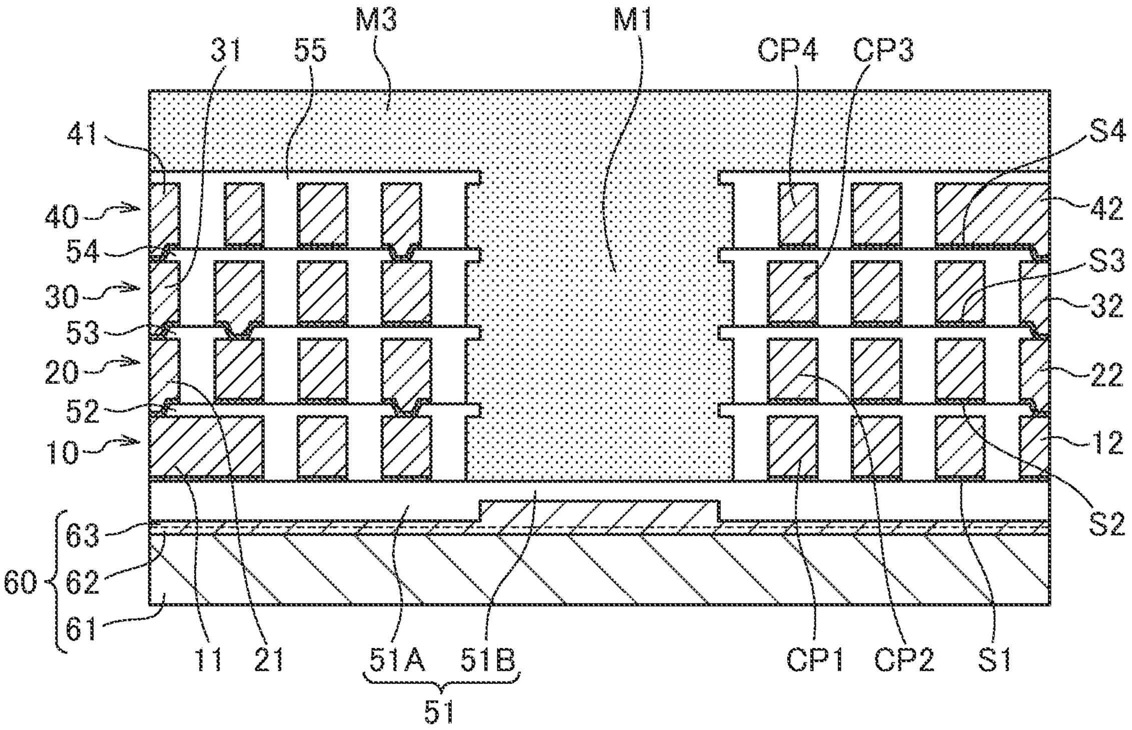
FIG. 27 is a process view for explaining the manufacturing method for the coil component 1.
Figure 28:
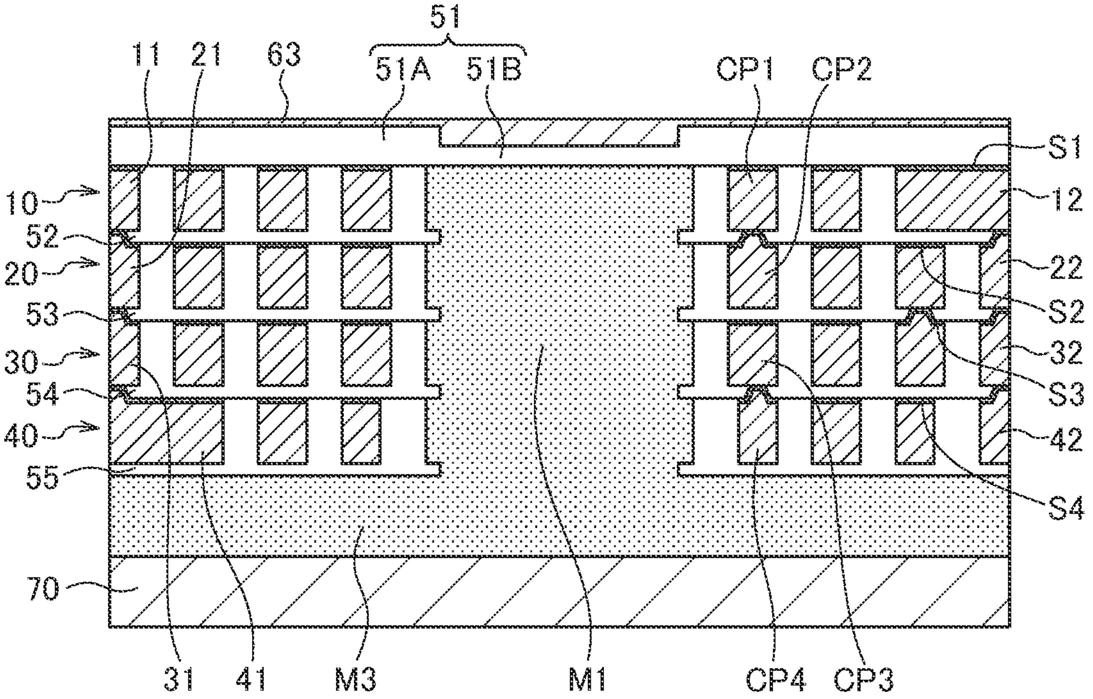
FIG. 28 is a process view for explaining the manufacturing method for the coil component 1.

Then, the magnetic element bodies M1 and M3 are formed to fill the space S (FIG. 27). Upon formation of the magnetic element bodies M1 to M3, a high pressure is applied to the innermost and outermost turns of the coil pattern CP4 positioned in the uppermost layer. However, in the present embodiment, the radial widths of parts of the interlayer insulating film 55 that cover respectively the innermost and outermost turns of the coil pattern CP4 are enlarged, thus preventing the innermost and outermost turns of the coil pattern CP4 from being deformed due to pressure applied upon formation of the magnetic element bodies M1 to M3.

Figure 29:
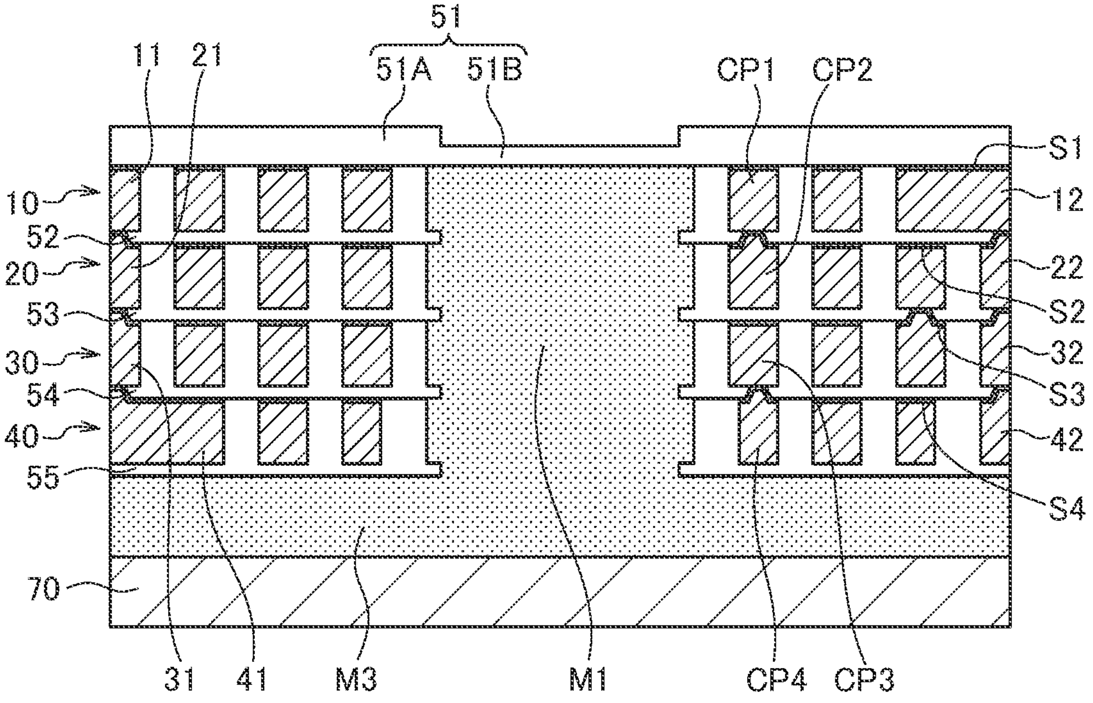
FIG. 29 is a process view for explaining the manufacturing method for the coil component 1.
Figure 30:
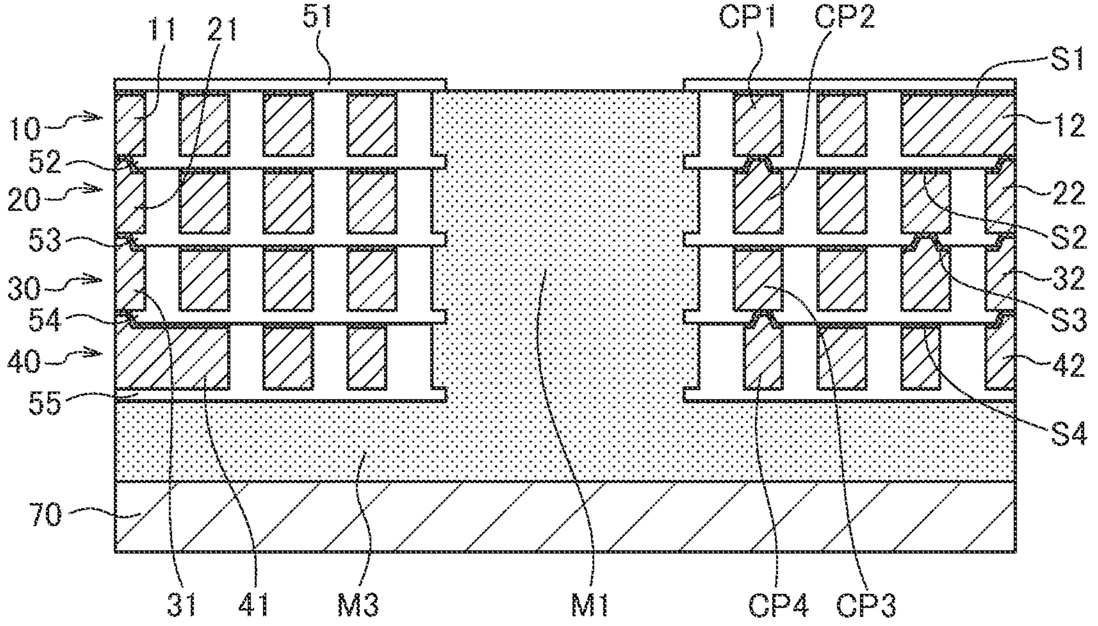
FIG. 30 is a process view for explaining the manufacturing method for the coil component 1.

Then, the metal foils 62 and 63 are peeled off at the interface therebetween to remove the support 60. Then, after inverting up and down, a support 70 is stuck (FIG. 28), followed by removal of the metal foil 63 by etching (FIG. 29). In this state, ashing is performed to reduce the film thickness of the interlayer insulating film 51 as a whole (FIG. 30). The reduction amount of the film thickness is adjusted to such a value that the small thickness area 51B is completely removed, while the large thickness area 51A remains there. As a result, the magnetic element body M1 filled in the inner diameter area of the coil part C is exposed. Although not illustrated, the magnetic element body M2 filled in the outside area of the coil part C is also exposed.

Figure 31:
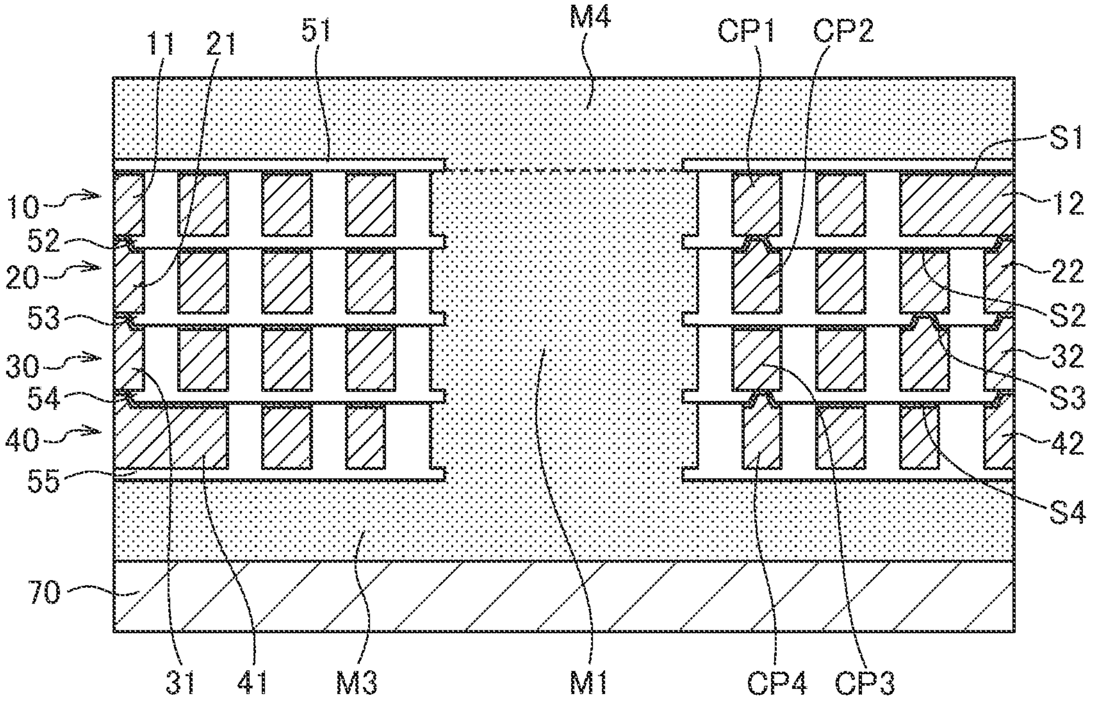
FIG. 31 is a process view for explaining the manufacturing method for the coil component 1.

Then, the magnetic element body M4 is formed so as to cover the interlayer insulating film 51 (FIG. 31). Subsequently, the support 70 is peeled off, and dicing is performed for singulation, whereby the coil component 1 according to the present embodiment illustrated in FIG. 1 is completed.

As described above, in the present embodiment, the radial width of a part of the interlayer insulating film 55 that is positioned between the magnetic element body M1 and the innermost turn of the coil pattern CP4 is enlarged to L41, and the radial width of a part of the interlayer insulating film 55 that is positioned between the magnetic element body M2 and the outermost turn of the coil pattern CP4 is enlarged to L42, whereby it is possible to prevent deformation of the innermost and outermost turns of the coil pattern CP4 due to pressure applied upon formation of the magnetic element bodies M1 to M3. Since the conductor layer 40 is positioned in the uppermost layer, there may be a case where the base of the resist pattern R4 has insufficient flatness; in this case, however, enlarging the width of the interlayer insulating film 55 allows stable formation of the resist pattern R4.

On the other hand, the coil patterns CP1 to CP3 positioned respectively in the conductor layers 10, 20, and 30 each have a sufficient conductor width, thereby allowing a reduction in DC resistance. There is no need for making the conductor widths of all the coil patterns CP1 to CP3 larger than the conductor widths W41 and W42 of the coil pattern CP4; however, for the coil pattern CP1 positioned in the lowermost layer, a sufficient conductor width can be ensured since it is formed on the surface having a high degree of flatness. Further, for the coil pattern CP3 positioned immediately below and whose inner peripheral end is connected to the inner peripheral end of the coil pattern CP4, it is preferable to make the width thereof larger than the conductor widths W41 and W42 so as to avoid sections with a small conductor width from being continued. Further, there is no need for enlarging both the width L41 of a part of the interlayer insulating film 55 that contacts the magnetic element body M1 and the width L42 of a part of the interlayer insulating film 55 that contacts the magnetic element body M2, and only the width L41 of a part of the interlayer insulating film 55 that contacts the magnetic element body M1 may be enlarged.

While the preferred embodiment of the present disclosure has been described, the present disclosure is not limited to the above embodiment, and various modifications may be made within the scope of the present disclosure, and all such modifications are included in the present disclosure.

REFERENCE SIGNS LIST

1 coil component
10, 20, 30, 40 conductor layer
11, 12, 21, 22, 31, 32, 41, 42 electrode pattern
51-55 interlayer insulating film
51A large thickness area
51B small thickness area
52*a* opening
60 support
61 base
62-65 metal foil
63*a* protruding part
70 support
C coil part
CP1-CP4 coil pattern
M1-M4 magnetic element body
R1, R2, R4 resist pattern
S space
S1-S4 seed layer
SL slit
VP1-VP4 sacrificial pattern

What is claimed is:

1. A coil component comprising:

a coil part having a structure in which a plurality of interlayer insulating films and a plurality of spirally wound coil patterns are alternately stacked in a coil axis direction; and a magnetic element body embedding therein the coil part, wherein the plurality of coil patterns includes at least a first coil pattern positioned at one end in the coil axis direction and a second coil pattern different from the first coil pattern, wherein the plurality of interlayer insulating films includes a first interlayer insulating film covering the first coil pattern at least in a radial direction and a second interlayer insulating film covering the second coil pattern at least in the radial direction, wherein the magnetic element body has a first part positioned in an inner diameter area of the coil part, wherein a radial width of a part of the first interlayer insulating film that is positioned between the first part of the magnetic element body and an innermost turn of the first coil pattern is larger than a radial width of a part of the second interlayer insulating film that is positioned between the first part of the magnetic element body and an innermost turn of the second coil pattern, and wherein a width in the radial direction of the innermost turn of the first coil pattern is narrower than a width in the radial direction of the innermost turn of the second coil pattern.

2. The coil component as claimed in claim 1, wherein the first interlayer insulating film further covers the first coil pattern from one end side in the coil axis direction.

3. The coil component as claimed in claim 1, wherein the second coil pattern is adjacent to the first coil pattern in the coil axis direction.

4. The coil component as claimed in claim 1, wherein the second coil pattern is positioned at other end in the coil axis direction.

5. The coil component as claimed in claim 1, wherein the magnetic element body further has a second part positioned at a radially outside area of the coil part, and wherein a radial width of a part of the first interlayer insulating film that is positioned between the second part of the magnetic element body and an outermost turn of the first coil pattern is larger than a radial width of a part of the second insulating layer that is positioned between the second part of the magnetic element body and an outermost turn of the second coil pattern.

6. The coil component as claimed in claim 1, wherein a radial width of a part of the first interlayer insulating film that is positioned between two radially adjacent turns of a plurality of turns constituting the first coil pattern is a same as a radial width of a part of the second interlayer insulating film that is positioned between two radially adjacent turns of a plurality of turns constituting the second coil pattern.

7. A method for manufacturing a coil component, the method comprising:

a first step of forming a coil part by alternately stacking a plurality of interlayer insulating films and a plurality of spirally wound coil patterns; and a second step of embedding the coil part in a magnetic element body, wherein the plurality of coil patterns includes a first coil pattern formed last and a second coil pattern different from the first coil pattern, wherein the plurality of interlayer insulating films includes a first interlayer insulating film covering the first coil pattern at least in a radial direction and a second interlayer insulating film covering the second coil pattern at least in the radial direction, wherein the magnetic element body has a first part positioned in an inner diameter area of the coil part, wherein a radial width of a part of the first interlayer insulating film that is positioned between the first part of the magnetic element body and an innermost turn of the first coil pattern is larger than a radial width of a part of the second interlayer insulating film that is positioned between the first part of the magnetic element body and an innermost turn of the second coil pattern, and wherein a width in the radial direction of the innermost turn of the first coil pattern is narrower than a width in the radial direction of the innermost turn of the second coil pattern.

8. The coil component as claimed in claim 2, wherein the second coil pattern is adjacent to the first coil pattern in the coil axis direction.

9. The coil component as claimed in claim 2, wherein the second coil pattern is positioned at other end in the coil axis direction.

* * * * *